United States Patent [19]

Yasuda et al.

[11] Patent Number: 5,132,369

[45] Date of Patent: Jul. 21, 1992

[54] PROCESS FOR PREPARING NARROW MOLECULAR WEIGHT DISTRIBUTION SYNDIOTACTIC BLOCK COPOLYMERS OF UNSATURATED CARBOXYLIC ACID ESTERS WITH α-OLEFINS

[75] Inventors: Hajime Yasuda, Hiroshima; Akira Nakamura, Moriguchi; Shigenobu Miyake, Oita, all of Japan

[73] Assignee: Showa Denko K.K., Tokyo, Japan

[21] Appl. No.: 655,491

[22] Filed: Feb. 14, 1991

[30] Foreign Application Priority Data

Feb. 14, 1990 [JP] Japan .................. 2-33549
Mar. 6, 1990 [JP] Japan .................. 2-54337
Oct. 18, 1990 [JP] Japan .................. 2-279899

[51] Int. Cl.$^5$ ............... C08F 4/52; C08F 255/02; C08F 255.04
[52] U.S. Cl. .................. 525/247; 525/245; 525/299; 526/170
[58] Field of Search ............ 525/245, 247, 299, 309; 526/170

[56] References Cited

U.S. PATENT DOCUMENTS

| | | | |
|---|---|---|---|
| 4,665,046 | 5/1987 | Campbell, Jr. | 502/102 |
| 4,689,368 | 8/1987 | Jenkins | 525/247 |
| 4,801,666 | 1/1989 | Marks | 526/123 |
| 5,064,802 | 11/1991 | Stevens et al. | 502/155 |
| 5,066,739 | 11/1991 | Pettijohn et al. | 526/127 |
| 5,066,741 | 11/1991 | Cambell, Jr. | 526/171 |

FOREIGN PATENT DOCUMENTS 64-14217  1/1989  Japan.
1259008 10/1989  Japan.
8605788 10/1986  World Int. Prop. O..

OTHER PUBLICATIONS

*J. American Society*, vol. 32, pp. 459–479 (1983).
*J. American Chemical Society*, vol. 105, pp. 1401–1403 (1983).
*J. American Chemical Society*, vol. 107, pp. 8091–8103 (1985).
P. L. Watson and T. Herskovitz, "Homogenous Lanthanide Complexes" (1983) Am Chem Soc. pp. 460–479 (No complete citation avail.).
F. A. cotton and G. Wilkinson, *Advanced Inorganic Chemistry*, 3rd Ed., Wiley, New York, 1972, p. 52, 1056–1057.

*Primary Examiner*—Joseph L. Schofer
*Assistant Examiner*—M. Nagumo
*Attorney, Agent, or Firm*—Sughrue, Mion, Zinn, Macpeak & Seas

[57] ABSTRACT

A process for preparing a narrow molecular weight distribution syndiotactic block copolymer of an unsaturated carboxylic acid ester (e.g., acrylate of methacrylate) with an α-olefin (e.g., ethylene) by using, as an initiator, at least one organometallic compound of the group consisting of (a) trivalent organic Y compounds, and (b) trivalent organic lanthanide (La, Ce, Pr, Nd, Pm, Sm, Eu, Ga, Tb, Dy, Ho, Er, Tm, Yb, Lu) compounds, or a combination thereof with an organoaluminum compound.

5 Claims, 1 Drawing Sheet

IR-SPECTRUM OF POLYETHYLENE-PMMA COPOLYMER

PROCESS FOR PREPARING NARROW MOLECULAR WEIGHT DISTRIBUTION SYNDIOTACTIC BLOCK COPOLYMERS OF UNSATURATED CARBOXYLIC ACID ESTERS WITH α-OLEFINS

BACKGROUND OF THE INVENTION

1. Field of the Invention

The present invention relates to a process for efficiently preparing a syndiotactic polymer of an unsaturated carboxylic acid ester (i.e., unsaturated carboxylate) such as (meth) acrylate having a narrow molecular weight distribution and a high molecular weight, and a block copolymer of an α-olefin such as ethylene with an unsaturated carboxylate.

2. Description of the Related Art

In the prior art, as the known technique for the preparation of polyacrylates having narrow molecular weight distributions, many processes are known which concern an anion polymerization with the use of an alkali metal and an alkaline earth metal compound. For example, when lithium is used as the initiator in liquid ammonia, one with a relatively narrower molecular weight distribution of $Mw/Mn = 1.5$ can be obtained (W. E. Good, J. Polym. Sci., 42, 367, 1960), and when 1,1-diphenylhexyllithium is used, a polymethyl methacrylate wherein $Mw/Mn = 1.18$ can be obtained (H. Hatada, Kobunshi Ronbunshu, 43, 857, 1986). Further, also with a Grignard reagent, a polymethyl methacrylate wherein $Mw/Mn = 1.2$ can be obtained, but the narrowness of the molecular weight distribution and the syndiotacticity obtained are not satisfactory.

As the method of preparing a polyacrylate with an extremely narrow molecular weight distribution, there are known the method using sodium-biphenyl (A. Roig, J. Polym. Sci., B3, 171, 1965) and the method using aluminum-poephyrin (Japanese Unexamined Patent Publication (Kokai) No. 1-259008), but these involve problems such that the molecular weight of the polymer obtained is small, the polymerization rate is slow, and an expensive polar solvent must be used.

Yasuda and Nakamura et al. have reported that a syndiotactic polymethyl methacrylate having a high molecular weight with a relatively lower molecular weight distribution can be obtained by using a lanthanide divalent compound as the initiator (Chemical Society of Japan, 58th Anniversary Meeting Pre-text I, 1 II B07, 1989). The polymerization using a lanthanide divalent compound as the initiator is attracting attention because it is a living polymerization, and because a polymer with a relatively narrower molecular distribution can be obtained.

Nevertheless, the polymethyl methacrylate formed with the above-mentioned lanthanide divalent compound is not very narrow, i.e., about $Mw/Mn = 1.2$, and the initiator efficiency remains as low as 25%. Also, the lanthanide divalent compound alone has no olefin polymerization activity, and no polymerization initiation ability for an acrylate.

The copolymer of a polymethacrylate and a polyolefin may be considered to have an excellent adhesiveness, printability, and compatibility with other polymers, but an efficient method of synthesizing same is not known. Japanese Unexamined Patent Publication (Kokai) No. 59-43003, proposed a method of copolymerizing propylene with an unsaturated carboxylate, using $TiCl_4$ and $Al(C_2H_5)_3$ as the catalyst in the presence of a Lewis acid, and Japanese Unexamined Patent Publication (Kokai) No. 64-14217, proposed a copolymerization of ethylene with an unsaturated carboxylate using a zero valent nickel chelate compound and aluminoxane, but these methods involve problems such that a large amount of Lewis acid is required, or a large amount of aluminoxane of the co-catalyst is required.

SUMMARY OF THE INVENTION

Accordingly, the objects of the present invention are to eliminate the above-mentioned disadvantages of the prior art and to provide a process for efficiently preparing a polymer of an unsaturated carboxylic acid ester having a narrow molecular weight distribution and a high molecular weight.

Another object of the present invention is to provide a process for efficiently preparing a copolymer of an α-olefin (e.g., ethylene) with an unsaturated carboxylic acid ester.

Other objects and advantages of the present invention will be apparent from the following description.

In accordance with the present invention, there is provided a process for preparing a polymer of an unsaturated carboxylic acid ester, comprising the step of polymerizing the unsaturated carboxylic acid ester in the presence of, as an initiator, at least one organometallic compound selected from the group consisting of (a) trivalent organic Sc compounds, (b) trivalent organic Y compounds, and (c) trivalent organic lanthanide (La, Ce, Pr, Nd, Pm, Sm, Eu, Ga, Tb, Dy, Ho, Er, Tm, Yb, Lu) compounds.

In accordance with the present invention, there is also provided a process for preparing a copolymer of an unsaturated carboxylic acid ester, comprising the step of copolymerizing the unsaturated carboxylic acid ester with an α-olefin in the presence of, as an initiator, at least one organometallic compound selected from the group consisting of (a) trivalent organic Sc compounds, (b) trivalent organic Y compounds, and (c) trivalent organic lanthanide (La, Ce, Pr, Nd, Pm, Sm, Eu, Ga, Tb, Dy, Ho, Er, Tm, Yb, Lu) compounds.

BRIEF DESCRIPTION OF THE DRAWINGS

The present invention will be better understood from the description set forth below with reference to the accompanying drawing of FIG. 1, which is an IR spectrum of the polyethylene-PMMA polymer obtained in Example 10 (Note: those obtained in Examples 11–15 also showed the same absorption).

DESCRIPTION OF THE PREFERRED EMBODIMENTS

Figure 1:
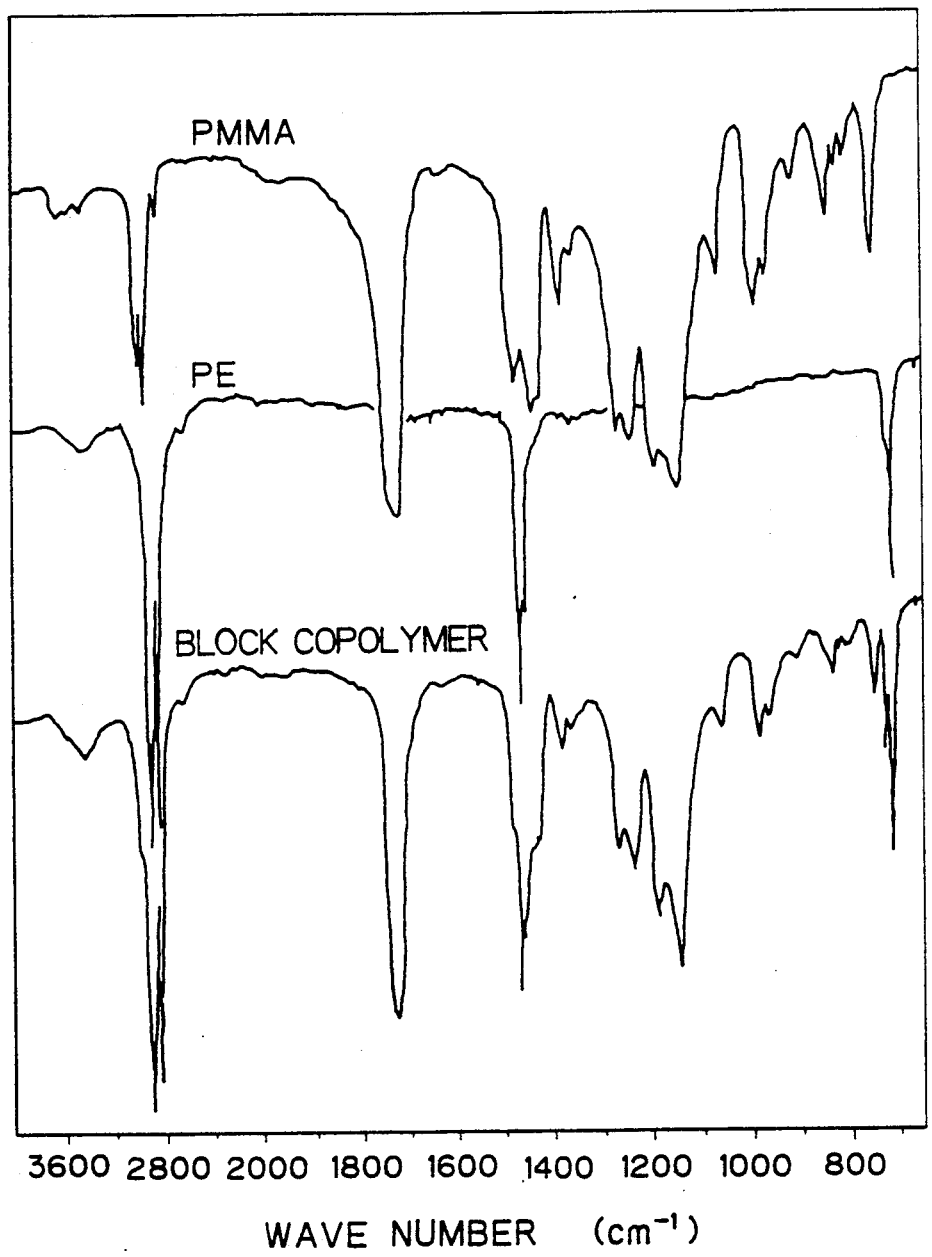

The present inventors made a further intensive study, and found that, 1) by carrying out a polymerization of, for example, an acrylate or a methacrylate by using an organic Sc compound, or an organic lanthanide compound, or a compound obtained from an organic aluminum together therewith, a living polymerization will proceed to give, for example, a polyacrylate and a polymethacrylate with a narrower molecular distribution and higher molecular weight, with a good efficiency, and further, 2) by carrying out a living polymerization of, for example, ethylene, and reacting an unsaturated carboxylic acid at the growth end thereof, a block ethylene-unsaturated carboxylate can be obtained, to thus accomplish the present invention.

The trivalent organic Sc compound and the trivalent organic Y compound are represented by the formulae (1) and (2):

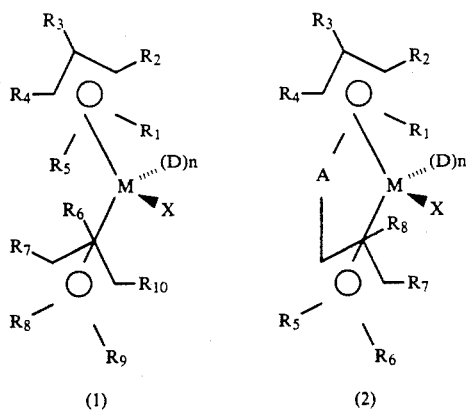

wherein $R_1$ to $R_{10}$ are a hydrogen atom, a hydrocarbon group having 1 to 5 carbon atoms or a hydrocarbon group containing silicon, and $R_1$ to $R_{10}$ may be also bonded through a hydrocarbon group to an adjacent R group. M is Sc, Y, La, Ce, Pr, Nd, Pm, Sm, Eu, Ga, Tb, Dy, Ho, Er, Tm, Yb, Lu. X is a hydrogen atom, a hydrocarbon group having 1 to 10 carbon atoms, or a hydrocarbon group containing silicon. A is an alkylene group having 1 to 3 carbon atoms or a silyalkylene group. D is a solvent molecule, and n is 0 to 3.

Examples of such compounds may include
biscyclopentadienyllutetium hydride,
biscyclopentadienyllutetiummethyl,
biscyclopentadienyllutetiumethyl,
biscyclopentadienyllutetiumbistrimethylsilylmethyl,
bispentamethylcyclopentadienyllutetium hydride,
bispentamethylcyclopentadienyllutetiummethyl,
bispentamethylcyclopentadienyllutetiumbistrimethylsilylmethyl,
biscyclopentadienylytterbium hydride,
biscyclopentadienylytterbiummethyl,
bispentamethylcyclopentadienylytterbium hydride,
bispentamethylcyclopentadienylytterbiummethyl,
bispentamethylcyclopentadienylytterbiumbistrimethvlsily-1- methyl,
biscyclopentadienylsamarium hydride,
biscyclopentadienylsamariummethyl,
bispentamethylcyclopentadienylsamarium hydride,
bispentamethylcyclopentadienylsamariumbistrimethylsilvlmethyl,
biscyclopentadienyleuropium hydride,
biscyclopentadienyleuropiummethyl,
bispentamethylcyclopentadienyleuropium hydride,
bispentamethylcyclopentadienyleuropiummethyl,
bispentamethylcyclopentadienylcerium hydride,
bispentamethylcyclopentadienylytriummethyl,
bispentamethylcyclopentadienylscandium hydride,
bispentamethylcyclopentadienylscandiummethyl,
bisindenyllutetiummethyl,
ethylenebisindenyllutetiummethyl,
ethylenebiscyclopentadienyllutetiummethyl and etherates,
tetrahydrofuranates of these compounds, etc., but are not limited thereto.

These compounds can be synthesized by known methods (Tobin J. Marks, J. Am. Chem. Soc., 107, 8091, 1985.; William J. Evans, J. Am. Chem. Soc., 105, 1401, 1983.; P. L. Watson, A. C. S. Symp., 495, 1983.; Tobin J. Marks, WO 8605788), but are not limited to the synthetic methods.

The organic aluminum compounds usable in the present invention are represented by the formula (3):

$$AlR_nX_{3-n}$$

wherein R is an aliphatic hydrocarbon group, X is a halogen element, n is an integer of 1 to 3.

Examples of the unsaturated carboxylic acid esters usable in the present invention are acrylates and methacrylates having by the formulae (4) and (5):

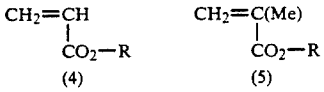

wherein R is a monovalent group selected from among aliphatic hydrocarbon groups, aromatic hydrocarbon groups, and hydrocarbon groups containing functional groups such as halogen, amine, ether.

Specifical examples thereof are methyl acrylate, ethyl acrylate, n-propyl acrylate, isopropyl acrylate, n-butyl acrylate, isobutyl acrylate, sec-butyl acrylate, t-butyl acrylate, isoamyl acrylate, lauryl acrylate, benzyl acrylate, phenyl acrylate, vinyl acrylate, methyl methacrylate, ethyl methacrylate, n-propyl methacrylate, isopropyl methacrylate, n-butyl methacrylate, isobutyl methacrylate, sec-butyl methacrylate, t-butyl methacrylate, isoamy methacrylate, n-hexyl methacrylate, cyclohexyl methacrylate, lauryl methacrylate, allyl methacrylate, vinyl methacrylate, benzyl methacrylate, phenyl methacrylate, naphthyl methacrylate, 2-methoxyethyl methacrylate, diethylene glycol monomethyl ether methacrylate, 2-dimethylaminoethyl methacrylate, but these are not limitative of the present invention.

Polymerization may be carried out in an inert gas by using the organic Sc trivalene compound and the organic Y trivalent compound and the trivalent organic lanthanide compound as the initiator, and charging a predetermined amount of an acrylate or a methacrylate which is the monomer in the presence of a solvent. For the copolymerization, an α-olefin such as ethylene or propylene, which is the first monomer, is introduced under an atmospheric pressure to carry out an α-olefin polymerization, and then an unsaturated carboxylate is added to the system to carry out a copolymerization, to thereby obtain a block copolymer.

There are no specific limitations to a ratio of the unsaturated carboxylic acid ester to the α-olefin, but the preferable ratio is 0.0001:1 to 1:1, more preferably 0.001:1 to 1:1.

As the inert gas, nitrogen, helium, and argon, etc., may be employed, but preferably argon is used.

The solvent usable in the polymerization includes halogenated hydrocarbons such as methylene chloride, chloroform, carbon tetrachloride, hydrocarbons such as benzene, toluene, xylene, tetrahydrofuran, and ether, and all thereof are preferably dehydrated and degassed before use. Polymerization is also possible in the absence of a solvent.

The unsaturated carboxylate usable in the polymerization is thoroughly dried with calcium hydride, molecular sieved, and distilled under an inert gas immediately before the polymerization.

The polymerization temperature may be varied over a wide range from the solidifying point to the boiling point of the solvent, but more preferably is not higher than room temperature. A specific feature of the preparation process of the present invention is that a polyacrylate and polymethacrylate with a narrow molecular weight distribution can be prepared over a wide temperature range from the solidifying point of the solvent to room temperature.

The preparation process of the present invention enables a polyacrylate and a polymethacrylate, and a block copolymer thereof with ethylene, to be easily synthesized.

In the present process, corresponding halides of the organic Sc trivalent compound and the organic Y trivalent compound and the organic lanthanide compound (e.g., biscyclopentadienylluthethium chloride, bispentamethylcyclopentadienylytterbium bromide) can be allowed to react with an alkyl alkali compound in an equal amount or less, to also give a polymerization catalysts.

Further, as a major specific feature of the present invention, once the initiator concentration and the monomer concentration are determined, the molecular weight of the polymer can be controlled over a wide range of 1,000 to 1,000,000 by controlling the reaction temperature and the polymerization time.

According to the process of the present invention, it is possible to prepare, for example, syndiotactic polymethacrylates and polyacrylates with a narrow molecular weight distribution and high molecular weight. The polymer is ideal as the standard substance for gel permeation chromatography. Also, by formulating the above-mentioned copolymer in thermoplastic resins such as polyolefins, the various properties of the resin such as coatability and adhesiveness can be improved due to the increase in the compatibility of the resins.

EXAMPLES

The present invention will now be further illustrated by, but is by no means limited to, the following Examples.

In the Examples and Comparative Examples, the molecular weight of the polymer formed was determined by GPC, and the molecular weight distribution estimated by Mw/Mn. The regularity of the polymer was calculated by $^1$H-NMR.

EXAMPLE 1

Into a 50 ml flask thoroughly replaced with dry argon were charged 1 ml of a toluene solution of bispentamethylcyclopentadienylyttriummethyl monoetherate (0.02 M) synthesized by a known method (P. L. Watson, A. C. S. Symp., 495, 1983) and 20 ml of dry toluene, and the mixture was adjusted to a polymerization temperature of 0° C. while stirring with a magnetic stirrer. Then, to the mixture was added 1 ml of methyl methacrylate dried with calcium hydride and molecular sieves by a syringe, and after the reaction, the reaction mixture was poured into a large amount of methanol to precipitate the polymer, which was washed and weighed after drying, followed by a GPC measurement.

EXAMPLE 2

Example 1 was repeated except that the polymerization temperature was made −40° C.

EXAMPLE 3

Example 1 was repeated except that bispentamethylcyclopentadienylsamarium hydride was employed as the initiator.

EXAMPLE 4

Example 1 was repeated except that bispentamethylcyclopentadienylsamarium hydride was temperature made −40° C.

EXAMPLE 5

Example 1 was repeated except that bispentamethylcyclopentadienylsamarium hydride was employed as the initiator, and the polymerization temperature made −78° C.

EXAMPLE 6

Example 1 was repeated except that bispentamethylcyclopentadienylsamariumbistrimethylsilylmethyl was employed as the initiator.

EXAMPLE 7

Example 1 was repeated except that bispentamethylcyclopentadienylsamariumbistrimethylsilylmethyl was used as the initiator, and the polymerization temperature made −40° C.

COMPARATIVE EXAMPLE 1

Example 1 was repeated except that 1,1-diphenylhexyllithium was employed as the initiator.

EXAMPLE 8

Example 1 was repeated except that bispentamethylcyclopentadienylytterbiummethyltrimethylaluminum was employed as the initiator.

EXAMPLE 9

Example 1 was repeated except that bispentamethylcyclopentadienylsamarium hydride was employed as the initiator, and methyl acrylate as the monomer.

TABLE 1

| Polymerization of methyl methacrylate and methyl acrylate with various initiators | | | | | | | |
|---|---|---|---|---|---|---|---|
| No. | Initiator | Polymerization time (h) | Polymerization temp. (°C.) | Molecular weight $Mn/10^3$ | Molecular weight distribution Mw/Mn | Syndio- tacticity rr % | Yield (%) |
| Example 1 | Cp*$_2$YbMe (OEt)$_2$ | 1 | 0 | 85 | 1.06 | 84.8 | 59 |
| Example 2 | Cp*$_2$YbMe (OEt)$_2$ | 15 | −14 | 89 | 1.06 | 88.6 | 98 |
| Example 3 | (Cp*$_2$SmH)$_2$ | 1 | 0 | 194 | 1.04 | 82.4 | 98 |
| Example 4 | (Cp*$_2$SmH)$_2$ | 15 | −40 | 137 | 1.06 | 88.3 | 98 |
| Example 5 | (Cp*$_2$SmH)$_2$ | 7.5 | −78 | 82 | 1.06 | 93.0 | 98 |
| Example 6 | Cp*$_2$SmCH (SiMe$_3$)$_2$ | 1 | 0 | 733 | 1.18 | 83.8 | 98 |
| Example 7 | Cp*$_2$SmCH (SiMe$_3$)$_2$ | 15 | −40 | 1117 | 1.26 | 88.3 | 98 |
| Example 8 | Cp*$_2$Yb (μ-Me)$_2$AlMe$_2$ | 1 | 0 | 130 | 1.05 | 84.3 | 34 |
| Example 9 | (Cp*$_2$SmH)$_2$ | 1 | 0 | 25 | 1.10 | 81.0 | 98 |
| Comparative | CH$_3$(CH$_2$)$_4$C(C$_6$H$_5$)$_2$Li | 3 | −78 | 10 | 1.18 | 83.8 | 100 |

TABLE 1-continued

Polymerization of methyl methacrylate and methyl acrylate with various initiators

| No. | Initiator | Polymerization time (h) | Polymerization temp. (°C.) | Molecular weight $Mn/10^3$ | Molecular weight distribution $Mw/Mn$ | Syndio-tacticity rr % | Yield (%) |
|---|---|---|---|---|---|---|---|
| Example 1 | | | | | | | |

Examples of block copolymers are shown in the following.

The molecular weights of the copolymers formed below were determined by GPC and the molecular weight distributions estimated by Mw/Mn. The quantitative ratio of ethylene and carboxylate in the copolymer was calculated from $^1$H-NMR and $^{13}$C-NMR.

EXAMPLE 10

Into a 50 ml flask thoroughly replaced with dry argon were charged 1 ml of a toluene solution of bispentamethylcyclopentadienylyttrbiummethyl monoetherate (0.02 M) synthesized by a known method (P. L. Watson, A. C. S. Symp., 495, 1983) and 20 ml of dry toluene, and after replacement of the argon gas with ethylene by cooling under a reduced pressure, the mixture was adjusted to a polymerization temperature of 30° C. while stirring with a magnetic stirrer. After the ethylene polymerization was carried out for 5 minutes, the unreacted ethylene gas was again replaced with argon gas by cooling under a reduced pressure. The polyethylene formed at this time was sampled in an amount of 5 ml by a syringe. To the remainder of the reaction mixture was added 1 ml of methyl methacrylate dried with aclacium hydride and molecular sieves by a syringe, and after the reaction, the reaction mixture was poured into a large amount of methanol to precipitate the polymer. The polymer obtained was heated under reflux in chloroform, and the insolubles in chloroform were filtered, dried and weighed, followed by GPC and NMR measurements.

EXAMPLE 11

Example 10 was repeated except for changing the polyethylene polymerization time to 10 minutes.

EXAMPLE 12

Example 10 was repeated except for changing the polymethylene polymerization time to 15 minutes.

EXAMPLE 13

Example 10 was repeated except for using bispentamethylcyclopentadienylsamarium hydride as the initiator, and changing the polyethylene polymerization time to 1 minute.

EXAMPLE 14

Example 10 was repeated except for using bispentamethylcyclopentadienylsamarium hydride as the initiator and changing the polyethylene polymerization time to 3 minutes.

COMPARATIVE EXAMPLE 2

Copolymerization was carried out in the same manner as in Example 10 except for using bispentamethylytterbiumbistetrahydrofuranate (divalent) as the initiator, but no copolymer was obtained.

EXAMPLE 15

Example 10 was repeated except for using bispentamethylcyclopentadienylytterbiummethyltrimethylaluminum as the initiator.

EXAMPLE 16

Example 10 was repeated except for using bispentamethylcyclopentadienylsamarium hydride as the initiator and methyl acrylate as the monomer.

The IR spectrum of the polyethylene-PMMA copolymer obtained in Example 10 is shown in FIG. 1.

TABLE 2

Preparation of polyethylene-PMMA copolymer with organic lanthanide trivalent compound $$-(CH_2CH_2)_n-(C(CH_3)CH_2)_m-$$
$$\qquad\qquad\qquad\quad |$$
$$\qquad\qquad\qquad\; CO_2CH_3$$

| Example No. | Initiator | Polyethylene polymerization time (min.) | Copolymer yield (mg) | Polyethylene block Mw | n | PMMA block Mw | m | Mw/Mn | Ethylene: MMA in polymer |
|---|---|---|---|---|---|---|---|---|---|
| 10 | Cp*$_2$YbMe(OEt)$_2$ | 5 | 120 | 5800 | 207 | 13800 | 138 | 1.85 | 1.5:1 |
| 11 | Cp*$_2$YbMe(OEt)$_2$ | 10 | 150 | 8500 | 303 | 2400 | 24 | 2.21 | 11.5:1 |
| 12 | Cp*$_2$YbMe(OEt)$_2$ | 15 | 150 | 73000 | 2600 | 5200 | 52 | 2.92 | 49.0:1 |
| 13 | [Cp*$_2$SmH]$_2$ | 1 | 80 | 33000 | 1178 | 7500 | 75 | 2.03 | 15.7:1 |
| 14 | [Cp*$_2$SmH]$_2$ | 2 | 100 | 48300 | 1725 | 1725 | 17 | 2.27 | 100.0:1 |
| 15 | Cp*$_2$YbMe/AlMe$_3$ | 10 | 70 | 54400 | 2000 | 2000 | 20 | 1.86 | 100.0:1 |
| 16*[2] | [Cp*$_2$SmH]$_2$ | 5 | 57 | 5800 | 207 | 1380 | 16 | 2.05 | 13.0:1 |

*[1]Cp* = pentamethylcyclopenntadienil
*[2]In Example 16, methyl acrylate was employed in place of methyl methacrylate

We claim:

1. A process for preparing a block copolymer of an unsaturated carboxylic acid ester with an α-olefin comprising the step of copolymerizing the unsaturated carboxylic acid ester with an α-olefin in the presence of, as an initiator, at least one organometallic compound selected from the group consisting of (a) trivalent organic Y compounds, and (b) trivalent organic lanthanide (la, Ce, Pr, Nd, Pm, Sm, Eu, Ga, Tb, Dy, Ho, Er, Tm, Yb, Lu) compounds.

2. A process as claimed in claim 1, wherein the unsaturated carboxylic acid ester is an acrylate, a methacrylate, or a mixture therewith and the α-olefin is ethylene.

3. A process as claimed in claim 1 wherein the ratio of the unsaturated carboxylic acid ester to the α-olefin is 0.0001:1 to 1:1.

4. A process as claimed in claim 1, wherein the initiator comprises said organometallic compound and at least one compound selected from the group consisting of organoalumino compounds.

5. A process as claimed in claim 4, wherein the unsaturated carboxylic acid ester is an acrylate, a methacrylate, or a mixture therewith and the $\alpha$-olefin is ethylene.

* * * * *

UNITED STATES PATENT AND TRADEMARK OFFICE
CERTIFICATE OF CORRECTION

PATENT NO. : 5,132,369
DATED : July 21, 1992
INVENTOR(S) : Hajime Yasuda

It is certified that error appears in the above-indentified patent and that said Letters Patent is hereby corrected as shown below:

Column 3, delete formulas (1) and (2) and insert the following formulas (1) and (2);

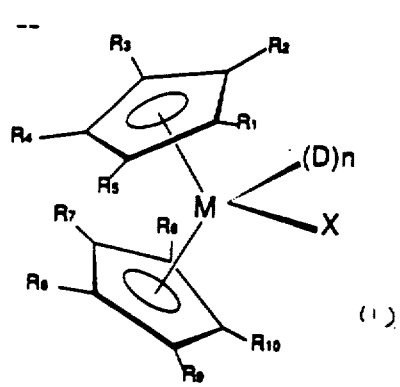
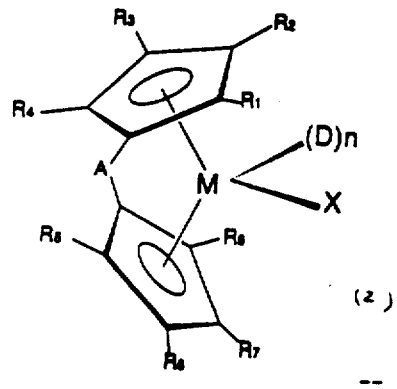

Signed and Sealed this

Seventh Day of December, 1993

Attest:

BRUCE LEHMAN

*Attesting Officer*     *Commissioner of Patents and Trademarks*